US010698760B2

(12) United States Patent
Acharya et al.

(10) Patent No.: US 10,698,760 B2
(45) Date of Patent: Jun. 30, 2020

(54) SYSTEM AND METHOD FOR AUTOMATED AND INTELLIGENT QUANTITATIVE RISK ASSESSMENT OF INFRASTRUCTURE SYSTEMS

(71) Applicant: GAS TECHNOLOGY INSTITUTE, Des Plaines, IL (US)

(72) Inventors: Saurav Acharya, Des Plaines, IL (US); Ernest Lever, Arlington Heights, IL (US); Robert Marros, Chicago, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 121 days.

(21) Appl. No.: 15/905,070

(22) Filed: Feb. 26, 2018

(65) Prior Publication Data

US 2018/0246780 A1 Aug. 30, 2018

Related U.S. Application Data

(60) Provisional application No. 62/464,869, filed on Feb. 28, 2017.

(51) Int. Cl.
*G06F 11/07* (2006.01)
*G06Q 50/06* (2012.01)
(Continued)

(52) U.S. Cl.
CPC .......... *G06F 11/0796* (2013.01); *G06N 5/02* (2013.01); *G06N 5/045* (2013.01); *G06N 7/005* (2013.01);
(Continued)

(58) Field of Classification Search
CPC .. G06F 11/3409; H04L 41/5025; H04L 41/06; H04L 63/1433; H04L 63/1425
See application file for complete search history.

(56) References Cited

U.S. PATENT DOCUMENTS 7,725,570 B1 * 5/2010 Lewis .................... G06Q 10/04
709/224
8,396,740 B1 * 3/2013 Watson ................ G06Q 50/163
705/412
(Continued)

FOREIGN PATENT DOCUMENTS

WO WO 2016/183332 A1 11/2016

OTHER PUBLICATIONS

U.S. Patent Office, English language version of the International Search Report, Form PCT/ISA/210 for International Application PCT/US18/19734, dated Apr. 24, 2018; (2 pages).
(Continued)

*Primary Examiner* — Nadeem Iqbal
(74) *Attorney, Agent, or Firm* — Pauley Erickson & Kottis

(57) ABSTRACT

An automated and intelligent quantitative system and method for assessing risk in infrastructure systems including, but not limited to, gas, electric, water, sewer, transportation, and/or telecommunication systems. The invention incorporates a graph-based data structure of multiple infrastructure systems. The graph-based data structure includes a multi-layered structure with each layer having nodes for components of one of the multiple infrastructure systems, and edge links between related pairs of the nodes. A spatio-temporal and ontological reasoner performs spatial and temporal reasoning on the graph-based data structure to identify nodes of the graph-based data structure likely affected by the new activity event.

20 Claims, 6 Drawing Sheets

(51) Int. Cl.
*G06N 7/00* (2006.01)
*G06N 5/02* (2006.01)
*G06N 20/20* (2019.01)
*G06N 5/04* (2006.01)

(52) U.S. Cl.
CPC ............ *G06N 20/20* (2019.01); *G06Q 50/06* (2013.01); *G06F 2201/805* (2013.01)

(56) References Cited

U.S. PATENT DOCUMENTS

| | | | | |
|---|---|---|---|---|
| 2005/0228905 | A1* | 10/2005 | Veeningen | G06Q 10/0635 710/1 |
| 2014/0137257 | A1* | 5/2014 | Martinez | H04L 63/1433 726/25 |
| 2014/0245449 | A1* | 8/2014 | Powell | G06F 21/552 726/25 |
| 2015/0347647 | A1* | 12/2015 | Osborne | B09C 1/002 703/6 |
| 2016/0234241 | A1* | 8/2016 | Talamanchi | H04L 63/1433 |
| 2016/0370478 | A1 | 12/2016 | Ouzounov et al. | |
| 2017/0126472 | A1* | 5/2017 | Margalit | H04L 41/0604 |

OTHER PUBLICATIONS

U.S. Patent Office, English language version of the Written Opinion of the International Searching Authority, Form PCT/ISA/237 for International Application PCT/US18/19734, dated Apr. 24, 2018 (8 pages).

* cited by examiner

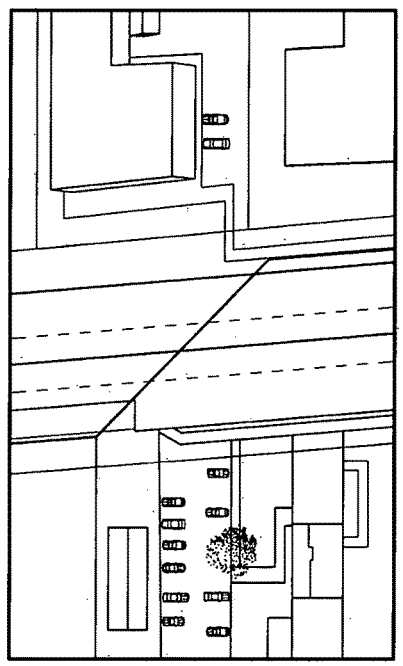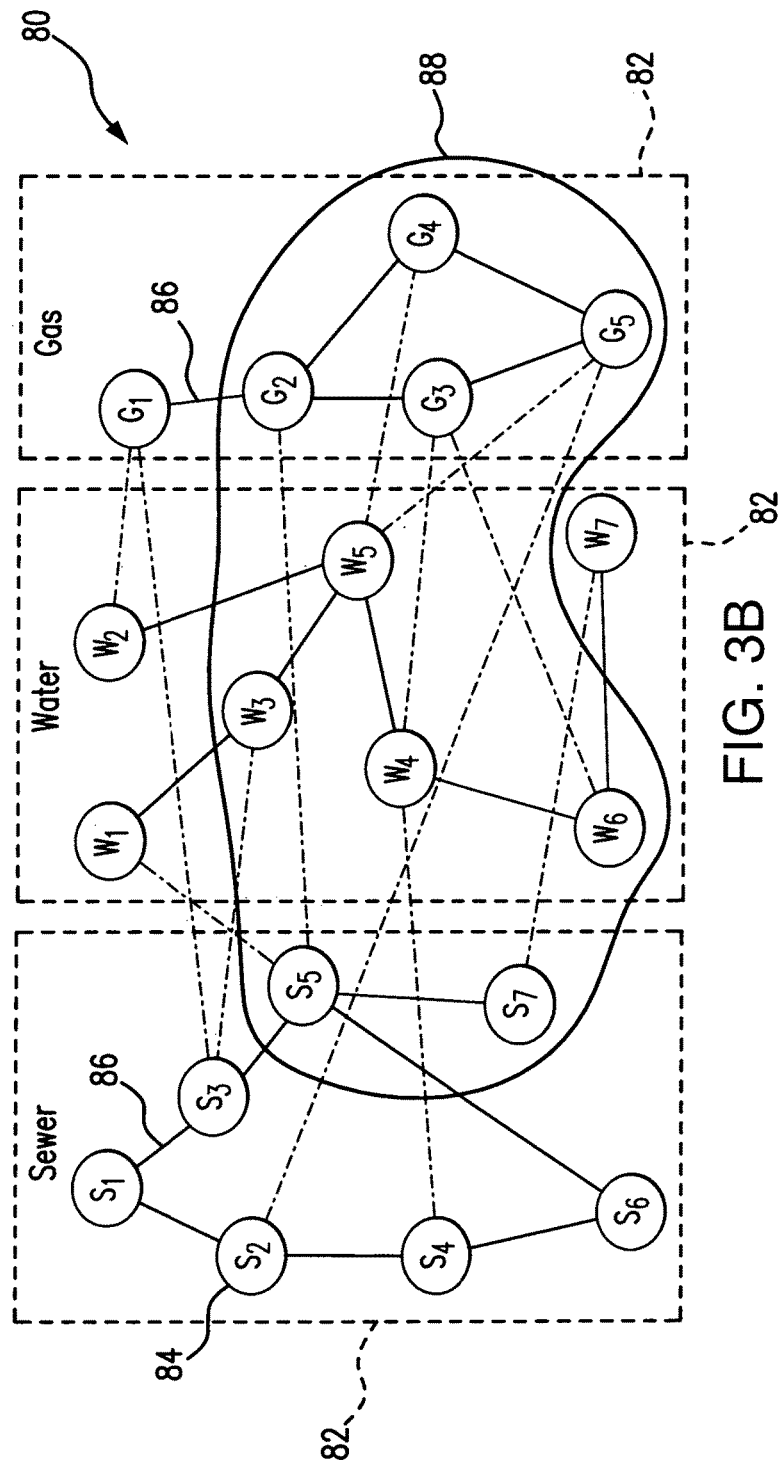
FIG. 3A
FIG. 3B

US 10,698,760 B2

SYSTEM AND METHOD FOR AUTOMATED AND INTELLIGENT QUANTITATIVE RISK ASSESSMENT OF INFRASTRUCTURE SYSTEMS

CROSS REFERENCE TO RELATED APPLICATION

This application claims the benefit of U.S. Provisional Patent Application, Ser. No. 62/464,869, filed on 28 Feb. 2017. The co-pending provisional application is hereby incorporated by reference herein in its entirety and is made a part hereof, including but not limited to those portions which specifically appear hereinafter.

STATEMENT REGARDING FEDERALLY SPONSORED RESEARCH OR DEVELOPMENT

This invention was made with government support under grant DTPH56 15 T00007 awarded by the Department of Transportation, PHMSA invention. The government has certain rights in the invention.

BACKGROUND OF THE INVENTION

Field of the Invention

This invention relates generally to an automated system and method for risk assessment of infrastructure systems such as gas, electric, water, sewer, transportation, and/or telecommunication systems.

Discussion of Related Art

Currently, some known risk management systems have built functionality to allow analyst to import data from Graphical Information Systems (GIS) and database systems for quantitative risk assessment. Known risk management systems include risk models that assume normal operations in an infrastructure. Most of these known systems cannot assume non-normal operations.

Traditional quantitative risk assessment systems operate as human-driven passive systems, and lack tight integration with GIS and database systems that store the latest data on infrastructures. Typically, the risk models are good at recognizing interactions of failures within the infrastructure; however, they ignore the interdependencies of interactions between infrastructures leading to cascading failures in multiple infrastructure systems when the effect of unusual events in one system propagates to others. Conventional quantitative risk assessment systems also make a range of assumptions about "normality" of infrastructure operations. In reality, the interactions in an infrastructure are largely influenced by unpredictable factors including human errors, which leaves risks of rare extreme events with very high consequences. Traditional QRA systems mostly fail to incorporate uncertainty and variability into risk assessments. Consequently, these systems provide a single point estimate of the risk, instead of the range and likelihood of a risk or hazard. More often, risk assessment methods neglect weak events that may ultimately be precursor to future catastrophic events.

As such, there is a continuing need for an improved system for risk assessment of infrastructure systems that overcomes the shortcomings described above.

SUMMARY OF THE INVENTION

The subject invention includes an intelligent system that performs automated quantitative risk assessment of infrastructure systems (e.g., gas, electricity, water, sewer, transportation, telecommunication, etc.) to continuously monitor their risk state in real time. The system of this invention aggregates information on multiple infrastructures from various data sources such as compliance, regulations, subject matter experts, GIS systems, database systems, and/or sensors. The aggregated knowledge is stored in a knowledge database, such as a graph database as an oracle of spatio-temporal relations of the infrastructure systems. In addition, a repository of risk ontologies is maintained which describes how infrastructure components are associated with different categories of risks.

Embodiments of this invention include a system for risk assessment of infrastructure systems that includes an aggregated database having a graph-based data structure of multiple infrastructure systems. An agent based event detection subsystem continuously monitors the infrastructure systems for any new event warranting risk assessment. A spatio-temporal and ontological reasoner performs spatial and temporal reasoning on the graph-based data structure to identify an impact area of the new event in an infrastructure, and a risk decision engine outputs a risk analysis for the current state of the infrastructures.

The invention further includes a system for risk assessment of infrastructure systems with an aggregated database including a graph-based data structure of multiple infrastructure systems. The graph-based data structure comprises a multi-layered structure with each layer comprising nodes for components of one of the multiple infrastructure systems, and edge links between related pairs of the nodes. An agent based event detection subsystem monitors the multiple infrastructure systems for any new activity event warranting risk assessment, and a spatio-temporal and ontological reasoner performs spatial and temporal reasoning on the graph-based data structure to identify nodes of the graph-based data structure likely affected by the new activity event. The reasoner can include risk ontology graphs correlating the identified nodes of the event within the graph-based data structure with risk categories. The reasoner performs graphical reasoning with the risk ontology graphs to determine a category of risks from the identified nodes.

The system desirably further includes a risk decision engine that performs quantitative risk analysis of a current state of the infrastructure systems, such as by modeling interactions of the failures in the infrastructure systems. In embodiments of this invention, the risk decision engine includes a data broker module configured to dynamically fetch appropriate data from the knowledge base based on the risk assessment query. A model selector module then selects one or more predetermined risk models as a function of the risk assessment query. A model ensembler module combines results of the one or more models, and a recommender module provides an answer from an output of the model ensemble module and risk ontologies.

The invention further includes a method for risk assessment of infrastructure systems, including: automatically aggregating information of a first infrastructure and a second infrastructure from a plurality of data sources; automatically creating a graph database of spatio-temporal relations between the first infrastructure and the second infrastructure; automatically determining an event of interest for the first infrastructure; and automatically determining a risk to the second infrastructure from the infrastructure event as a function of the graph database. The method desirably is fully automated, and includes automatically continuously monitoring the data sources for new infrastructure events in the first and second infrastructures, such as selected from installation events, construction events, repair events, inspection events, replacement events, and/or disaster events. The method can further include automatically identifying the components of the first and second infrastructures affected by the infrastructure event by reasoning on or from the graph database and determining a category of risks from the identified components. Modeling interactions of failures in the first and second infrastructures can be used to determine the risk to the second infrastructure.

In embodiments of this invention, the method includes identifying infrastructure nodes of the graph-based data structure having a predetermined likelihood of being affected by the infrastructure event; and correlating the nodes with risk categories. Correlating the nodes via graphical reasoning with risk ontology graphs is useful for determining a category of risks from or for the nodes.

The system continuously monitors the data sources, such as compliance systems, regulation systems, subject matter experts, GIS systems, database systems, infrastructure sensors, and combinations thereof, for new events in the infrastructure such as construction, repair, inspection, etc. Once a new event is detected, the risk assessment process is automatically initiated. A next step is to run spatial and temporal reasoning on the graph database to identify the components of infrastructure systems affected by the event. Then, the categories of risks from the identified components are automatically determined. Quantitative risk assessment for those risk categories and affected components are run before reporting results via electronic means.

In a preferred embodiment, the risk model assumes at least some of the following: non-normality of infrastructure operations; complex interactions of failures in an infrastructure and between infrastructures; weak interactions of failures may be precursor to future catastrophic events; and/or presence of sparse and low quality data.

The risk assessment of this invention is desirably probabilistic and can run both prognosis and diagnosis of the risk state. The risk assessment is performed automatically by one or more data processors or server, either cloud-based or in-house, executing encoded software instructions stored on a recordable medium in computing combination with the data processor. The outcome of risk assessment is preferably delivered, such as over a network, by one or more methods such as via web dashboard, mobile dashboard, texts, alerts, and/or reports.

BRIEF DESCRIPTION OF THE DRAWINGS

These and other objects and features of this invention will be better understood from the following detailed description taken in conjunction with the following drawings.

FIG. 3A shows a GIS data map.

FIG. 3B shows an infrastructure knowledge base for the GIS data of FIG. 3A, according to one embodiment of this invention.

DESCRIPTION OF PREFERRED EMBODIMENTS

The invention provides a system and method for automating an end to end process of quantitative risk assessment in real time using concepts of artificial intelligence, database, GIS, graph theory, and risk management. Embodiments of this invention include or provide agent based event detection, whereby dedicated listener agents embedded in data sources monitor for any new event activities warranting risk assessment. The invention maintains aggregated knowledge of multiple infrastructure systems by combining enterprise and external data sources, and applies the event detection data to the combined infrastructure data structure to determine effects of the event across the multiple infrastructures.

Figure 1:
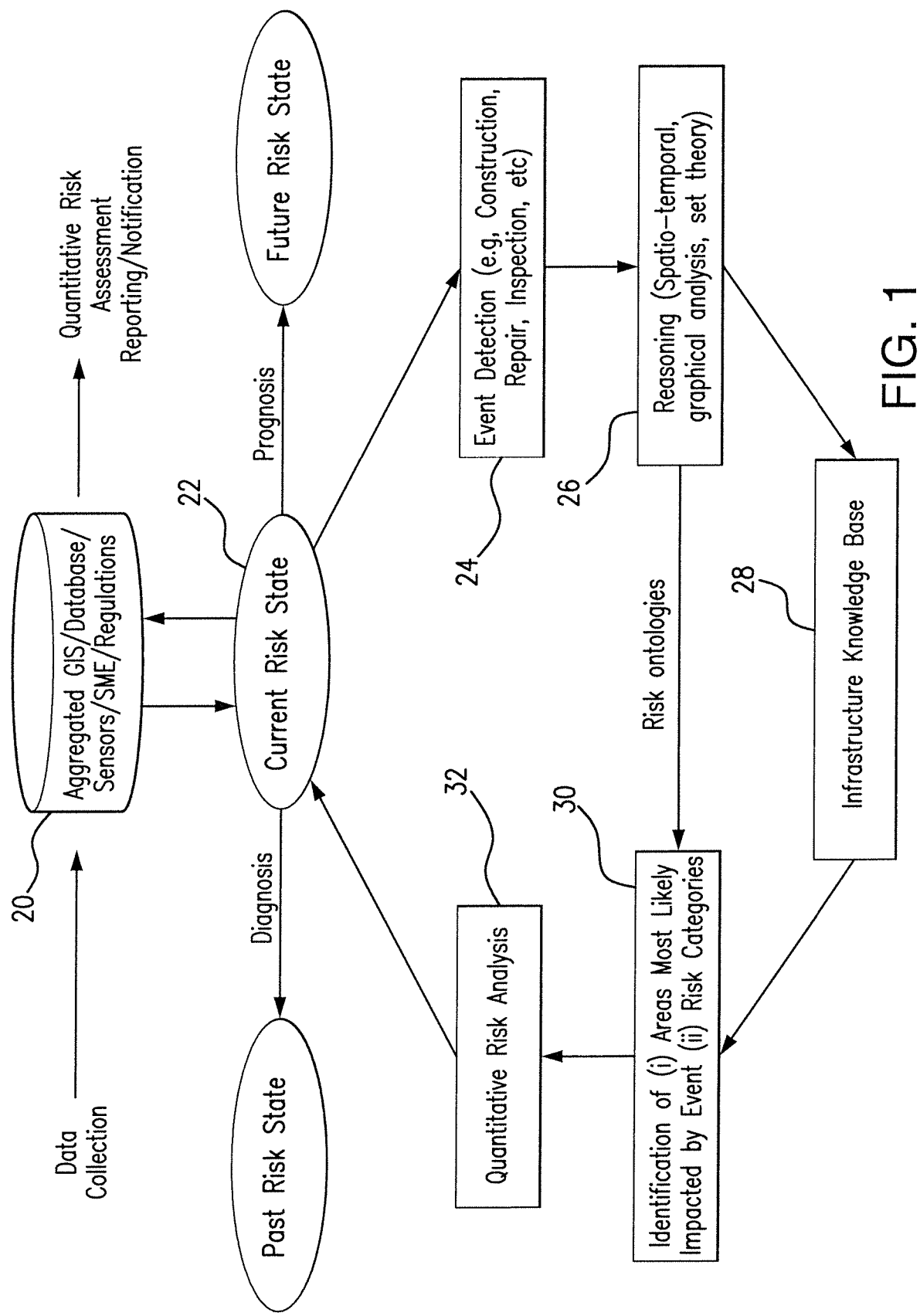
FIG. 1 is a flow diagram of the system and method according to one embodiment of this invention.

FIG. 1 illustrates a system workflow according to one embodiment of this invention. The system aggregates data from multiple sources in step 20, such as from regulations, subject matter experts, GIS systems, database systems, and/or sensors monitoring multiple infrastructure systems. The system performs quantitative risk assessment on the aggregated data that assumes the following: non-normality of infrastructure operations; complex interactions in an infrastructure and between infrastructures; and weak interactions of failures may be precursor events predictive of future catastrophic events.

The current risk state 22 is determined, and the risk assessment is desirably probabilistic and can run both prognosis and diagnosis of the risk state. The risk assessment is determined by determining an event 24, and performing spatio-temporal graphical analysis 26 via graphical reasoning with risk ontologies (e.g., risk ontology graphs). The risk ontology analysis of the data in the infrastructure knowledge base/graphs 28 determines a category of risk for the event. The areas and infrastructure systems most likely impacted are determined 30 and quantitative risk analysis 32 leads to a risk assessment result. The system performs the workflow automatically, and notifies the outcome of the risk assessment by, for example, web dashboard, mobile dashboard, texts, alerts, and/or reports.

Figure 2:
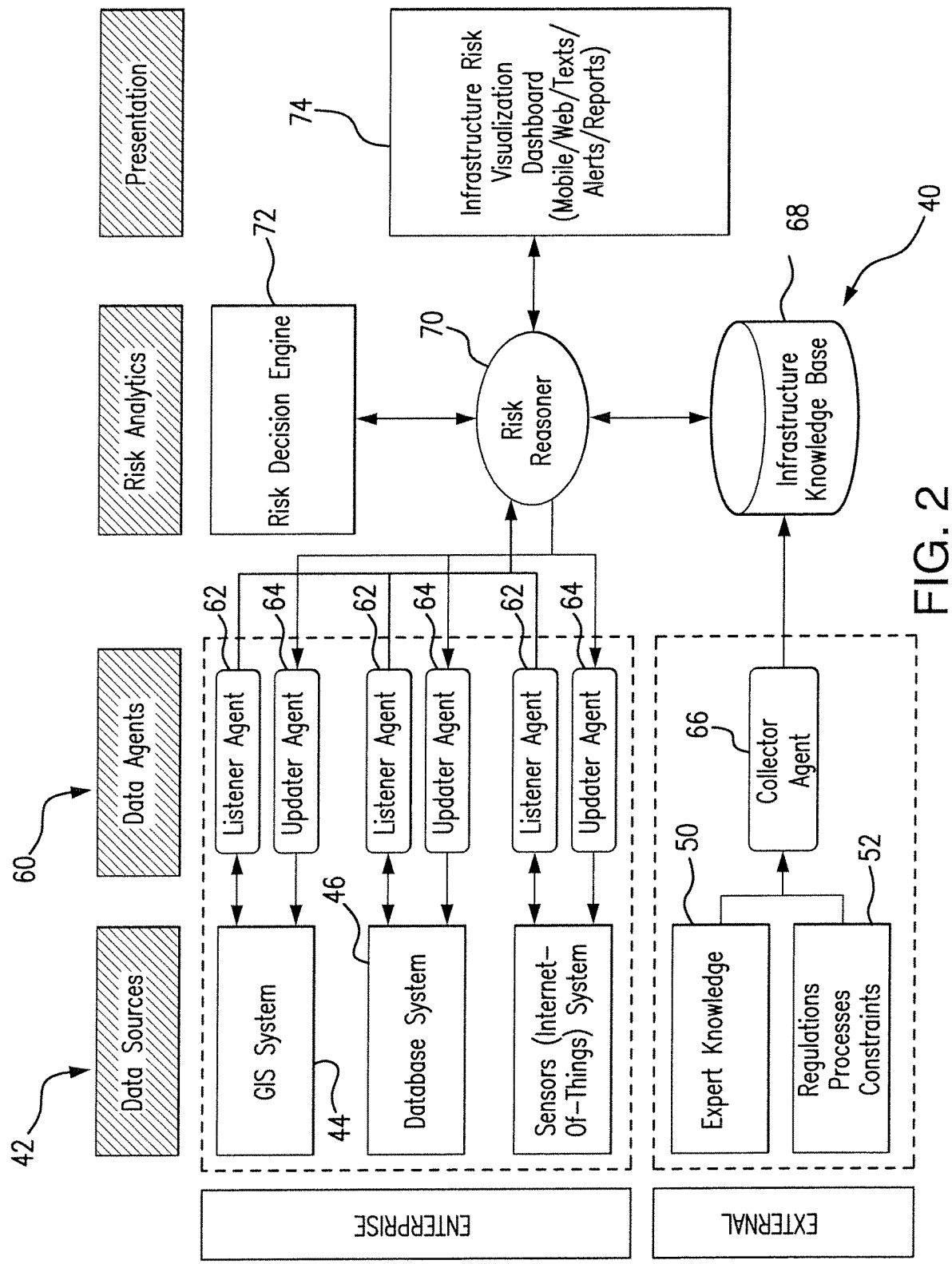
FIG. 2 representatively shows a system architecture according to one embodiment of this invention.

FIG. 2 illustrates a system 40 and system workflow for risk assessment of infrastructure systems, according to one embodiment of this invention. As in FIG. 1, the system applies risk analytics to information from data sources and/or data agents, to output a risk assessment across one or more infrastructure systems from a determined event detection. The data sources 42 can include internal or enterprise data sources, such as GIS system data 44, database systems 46, and sensor system data 48 (e.g. Internet-of-things). The data sources 42 can also include external data sources, such as subject matter expert knowledge 50, rules and regulations, processes, and constraint data 52.

The system 40 includes data agents 60 for automatically monitoring the data sources and updating the sources or data as necessary. For the enterprise sources, a dedicated listener agent 62 is desirably assigned to each data source, and continually 'listens' to the data source to detect any new change events (e.g., component installation, repair, inspection, etc.) warranting risk assessment. Each enterprise data source also has a dedicated updater agent 64, which updates the data source with the outcome of the quantitative risk assessment of the system 40 or other pertinent information. A collector agent 66 gathers data from the external sources.

The system 40 includes an aggregation of knowledge of multiple infrastructure systems in infrastructure knowledge base 68. The infrastructure knowledge base 68 combines the enterprise and external data sources 42. The infrastructure knowledge base 68 is in combination with risk reasoner 70. Desirably, the risk reasoner maintains the infrastructure knowledge base 68, such as by initialization by aggregating the multiple data sources and/or by frequently updating the infrastructure knowledge base 68 by automatically receiving and analyzing the events from the listener agents 62. The reasoner 70 further performs reasoning to determine affected components and risks from an event in infrastructure. In embodiments of this invention, the reasoner 70 automatically runs spatial and temporal reasoning on the infrastructure knowledge base 68 to identify one or more impact areas of the event, thus identifying likely components across multiple infrastructures that may be affected by the event.

The reasoner 70 further aggregates the relevant information of the components affected by the event and sends it to the risk decision engine 72 for quantitative assessment of the category of risks identified. The reasoner 70 also sends the result of risk assessment (e.g., risk category and quantified risk metrics) to the updater agent 64 and/or an output device 74 for presentation to the relevant entities/people. The output device 74 in FIG. 2 is an infrastructure risk visualization dashboard GUI, which can present information, alerts, and/or reports via mobile or web devices.

FIG. 3B illustrates a multi-layered, graph-based data structure 80 of multiple infrastructure systems (of FIG. 3A) suitable as or used with the aggregated database of the infrastructure knowledge base 68. FIG. 3A shows GIS system data, showing the positional relationship between three infrastructure systems, namely sewer, water and gas infrastructures. FIG. 3B shows the infrastructure knowledge base for these infrastructure systems, with each layer 82 representing one of the infrastructure systems. Each node 84 of each layer represents a component of the corresponding infrastructure system, and desirably contains information about that component. Each edge 86 represents a spatio-temporal relation between the corresponding nodes 84 of one or more infrastructure systems.

Figure 4:
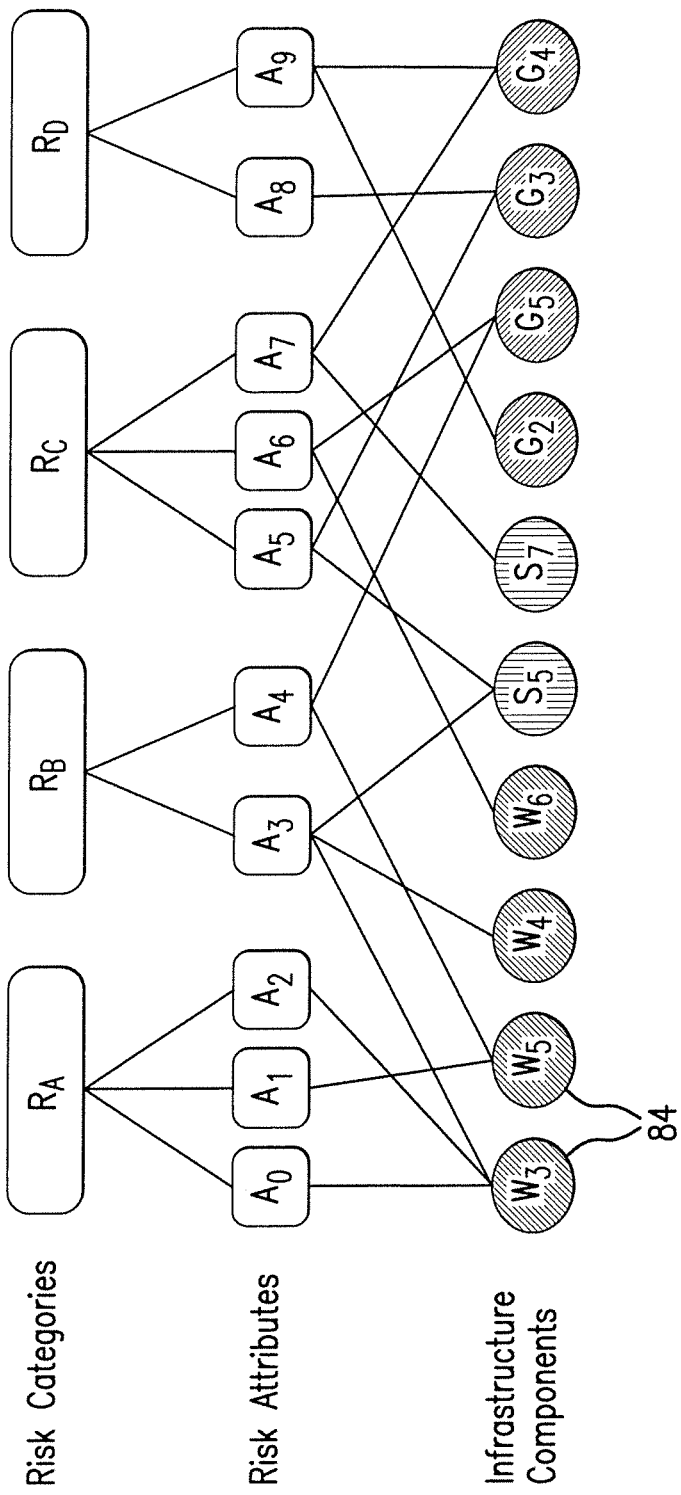
FIG. 4 illustrates a reasoner module and functionality according to one embodiment of this invention.
Figure 5:
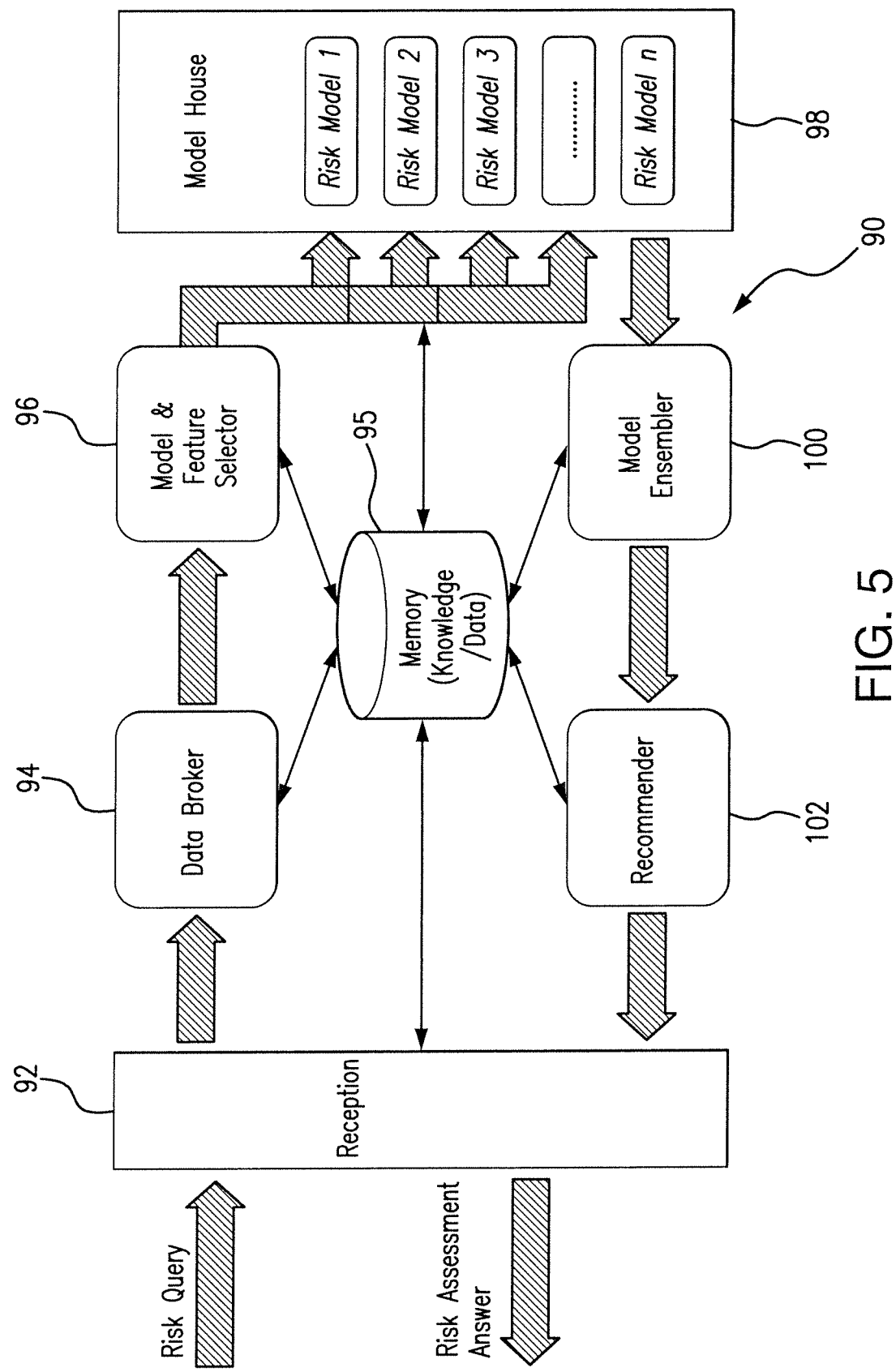
FIG. 5 illustrates a risk decision engine according to one embodiment of this invention.

The system of embodiments of this invention includes an agent based event detection subsystem to monitor the multiple infrastructure systems of layer 82 for any new activity event warranting risk assessment. FIGS. 4-5 illustrates a spatio-temporal and ontological reasoner that performs spatial and temporal reasoning on the graph-based data structure 80 to identify an impact area of a new event in one or more of the infrastructures. The reasoner identifies areas of likely assets in multiple infrastructures that may be affected by the event. In FIG. 4, for example, an event is determined for node $G_3$, and the reasoner determines the impact area 88 and the likely affected components (namely $S_5$, $S_7$, $W_{3-6}$, and $G_{2-5}$). For example, these affected components can be in the impact area due to proximity to each other, or other issues, such as being along construction sites/routes, or requiring shut-off for the event.

In embodiments of this invention, the reasoner maintains a repository of risk ontologies, such as embodied as graphs describing association between components and risk categories in the infrastructures. The reasoner performs graphical reasoning on the risk ontologies to determine the category of risks from the components affected by the event. Examples of risk include, without limitation, natural risks, organizational risks, technical risks, socio-economical risks, socio-political risks, security risks, and ecological risks. FIG. 4 illustrates a risk ontology according to one embodiment of this invention. The component nodes 84 are associated with risk categories through risk attributes.

The risk reasoner aggregates the relevant information of the node components affected by the event and sends it to the risk decision engine for quantitative assessment of the category of risks identified. FIG. 5 illustrates a risk engine according to one embodiment of this invention. The risk engine 90 includes a reception module 92 that receives the query and sends the solution. The reception module desirably validates and parses the query and/or data, and logs information to memory 95. A data broker 94 fetches data from the memory that are relevant to the query, prepares the data by cleaning and pruning as needed, and further logs information to memory 95. A model selector 96 selects single or multiple risk models from model house 98, based upon, for example, knowledge from an ontology that resides in the memory 95, a query function, and/or the data itself. The model selector 96 can select important and appropriate features from data by performing statistical tests.

The model house 98 includes a collection of models. The model house 98 provides scalable and distributed cloud computing power to models as required. The model house 98 desirably supports a range of applications, from simple mathematical models to complex image processing models. The selected model strategies are loaded by the model ensembler module 100, and stored in memory 95. The model ensembler 100 analyzes the selected models and decides the best solution form the results of the multiple models. A recommender module 102 provides the risk assessment result, along with any solution recommended.

Figure 6:
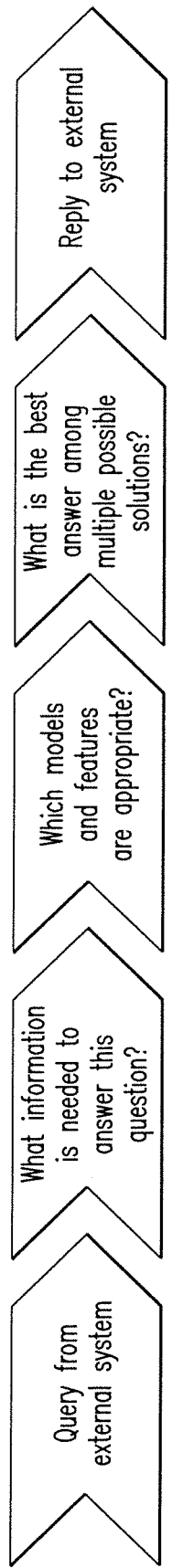
FIG. 6 illustrates a decision making process according to one embodiment of this invention.
Figure 7:
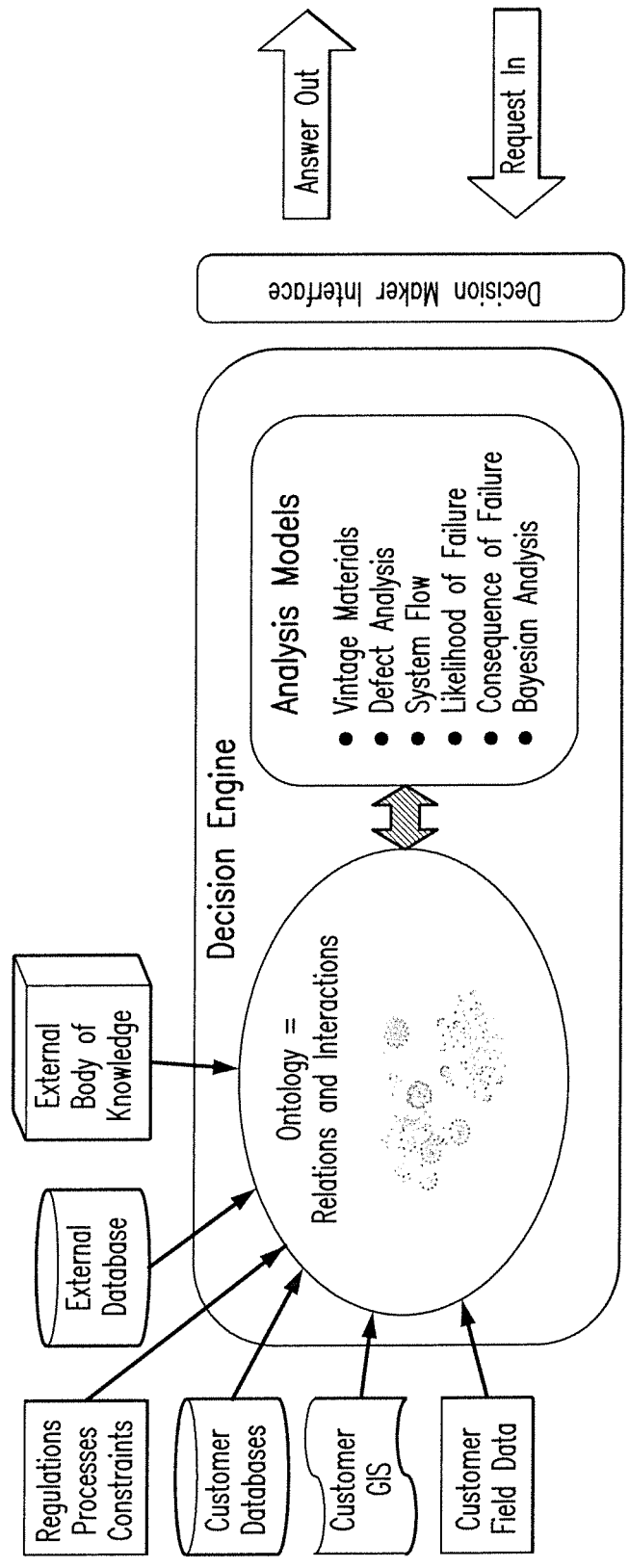
FIG. 7 generally illustrates a risk decision engine according to one embodiment of this invention.

FIGS. 6 and 7 illustrate risk analytics of the risk decision engine according to embodiments of this invention. FIG. 6 is a flow diagram of, for example, the method described for FIG. 5. In FIG. 6, the method includes determining what information is needed, selecting the appropriate models and features, and determining the best answer among the models as a basis for the assessment/reply. FIG. 7 generally illustrates the use of data, and application of analysis models. In general, the risk decision engine: assumes non-normality of infrastructure operations in risk models; models interactions of failures in infrastructure system, including weak interactions that may be precursor to future catastrophic events; models complex interactions of failures between multiple infrastructure systems; employs diagnostic and prognostic risk models; supports probabilistic risk assessment that provides the range and likelihood of a risk or hazard, instead of just a single point estimate; provides both relative qualitative risk models and fully quantitative risk models; deals with sparse and low quality data sets; and/or incorporates an ensemble approach of executing multiple risk scenario models to determine the best outcome.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A system for risk assessment of infrastructure systems, comprising:
an aggregated database including a graph-based data structure of components of multiple infrastructure systems, wherein the graph-based data structure represents a spatio-temporal relation between the components across the multiple infrastructure systems;
an agent based event detection subsystem to monitor the multiple infrastructure systems for any new activity event warranting risk assessment;
a spatio-temporal and ontological reasoner to perform spatial and temporal reasoning on the graph-based data structure to identify an impact area across the multiple infrastructure systems of a new event in one of the multiple infrastructure systems; and
a risk decision engine.

2. The system of claim 1, wherein the infrastructure systems include at least two of: a gas system, an electricity system, a water system, a sewer system, a transportation system, and/or a telecommunication system.

3. The system of claim 1, wherein the graph-based data structure comprises a multi-layered structure, with each layer comprising one of the multiple infrastructure systems.

4. The system of claim 1, wherein the agent based event detection subsystem comprises hardware or software modules in monitoring combination with each of the infrastructure systems.

5. The system of claim 4, wherein the agent based event detection monitors multiple data sources, selected from compliance systems, regulation systems, subject matter experts, GIS systems, database systems, infrastructure sensors, and combinations thereof.

6. The system of claim 1, wherein the graph-based data structure comprises nodes and edge links for spatio-temporal relation between related pairs of the nodes, wherein each node corresponds to a component of each of the multiple infrastructures.

7. The system of claim 6, wherein the reasoner identifies nodes of the graph-based data structure likely affected by the new activity event.

8. The system of claim 7, wherein the reasoner comprises risk ontology graphs correlating the identified nodes with risk categories, and the reasoner performs graphical reasoning with the risk ontology graphs to determine a category of risks from the identified nodes.

9. The system of claim 1, wherein the risk decision engine models interactions of failures in the infrastructure systems.

10. The system of claim 1, wherein the risk decision module comprises diagnostic and prognostic risk models.

11. A system for risk assessment of infrastructure systems, comprising:
an aggregated database including a graph-based data structure of multiple infrastructure systems, the graph-based data structure comprising a multi-layered structure with each layer comprising nodes for components of one of the multiple infrastructure systems, and edge links between related pairs of the nodes, the edge links representing positional and interaction relations between the related pairs of the nodes in the each layer and across overlapping layers of the multi-layered structure;
an agent based event detection subsystem to monitor the multiple infrastructure systems for any new activity event warranting risk assessment;
a spatio-temporal and ontological reasoner to perform spatial and temporal reasoning on the graph-based data structure to identify nodes across the multiple infrastructure systems likely affected by the new activity event; and
a risk decision engine.

12. The system of claim 11, wherein the infrastructure systems include at least two of: gas systems, electricity systems, water systems, sewer systems, transportation systems, or telecommunication systems.

13. The system of claim 11, wherein the reasoner comprises risk ontology graphs correlating the identified nodes with risk categories, and the reasoner comprises executable coded instructions to perform graphical reasoning with the risk ontology graphs to determine a category of risks from the identified nodes.

14. A method for risk assessment of infrastructure systems, comprising:
automatically aggregating information of a first infrastructure and a second infrastructure from a plurality of data sources;
automatically creating a graph database of spatio-temporal relations between components of the first infrastructure and the second infrastructure, wherein the graph database represents positional and interaction relations between the components within and across the first infrastructure and the second infrastructure;
automatically determining an infrastructure event for the first infrastructure; and
automatically determining a risk to the second infrastructure from the infrastructure event as a function of the positional and interaction relations between the components in the graph database.

15. The method of claim 14, further comprising aggregating from multiple data sources, selected from compliance systems, regulation systems, subject matter experts, GIS systems, database systems, infrastructure sensors, and combinations thereof.

16. The method of claim 14, further comprising automatically continuously monitoring the data sources for new infrastructure events in the first and second infrastructures, selected from construction events, repair events, inspection events, and/or disaster events.

17. The method of claim 14, further comprising automatically identifying the components of the first and second infrastructures affected by the infrastructure event by reasoning on or from the graph database and determining a category of risks from the identified components.

18. The method of claim 14, further comprising modeling interactions of failures in the first and second infrastructures to determine the risk to the second infrastructure.

19. The method of claim 14, further comprising:
identifying infrastructure nodes of the graph-based data structure having a predetermined likelihood of being affected by the infrastructure event; and
correlating the nodes with risk categories.

20. The method of claim 19, further comprising correlating the nodes via graphical reasoning with risk ontology graphs to determine a category of risks from the nodes.

* * * * *